US008781677B2

(12) United States Patent
Roberts et al.

(10) Patent No.: US 8,781,677 B2
(45) Date of Patent: Jul. 15, 2014

(54) HIGH CENTERING BASES FOR HOSPITAL GURNEYS

(71) Applicants: Timothy Roberts, Palatine, IL (US); Daniel Stout, Marengo, IL (US)

(72) Inventors: Timothy Roberts, Palatine, IL (US); Daniel Stout, Marengo, IL (US)

(73) Assignee: Hospital Therapy Products, Wood Dale, IL (US)

( * ) Notice: Subject to any disclaimer, the term of this patent is extended or adjusted under 35 U.S.C. 154(b) by 0 days.

(21) Appl. No.: 13/832,935

(22) Filed: Mar. 15, 2013

(65) Prior Publication Data

US 2013/0282234 A1 Oct. 24, 2013

Related U.S. Application Data

(60) Provisional application No. 61/637,243, filed on Apr. 23, 2012.

(51) Int. Cl.
*G06F 7/00* (2006.01)

(52) U.S. Cl.
USPC .................... 701/36; 5/81.1 R; 5/86.1; 5/600; 280/43; 280/43.17; 280/250.1; 280/304.1; 280/647; 280/648

(58) Field of Classification Search
None
See application file for complete search history.

(56) References Cited

U.S. PATENT DOCUMENTS

| | | | | |
|---|---|---|---|---|
| 2,599,717 | A | 6/1952 | Menzies | |
| 3,304,116 | A | 2/1967 | Stryker | |
| 3,876,024 | A | 4/1975 | Shieman et al. | |
| 4,164,355 | A | 8/1979 | Eaton et al. | |
| 4,175,783 | A | 11/1979 | Pioth | |
| 4,629,242 | A | 12/1986 | Schrager | |
| 4,723,808 | A | 2/1988 | Hines | |
| 4,987,623 | A | 1/1991 | Stryker et al. | |
| 5,063,624 | A | 11/1991 | Smith et al. | |
| 5,069,465 | A | 12/1991 | Stryker et al. | |
| 5,083,625 | A | 1/1992 | Bleicher | |
| 5,348,326 | A | 9/1994 | Fullenkamp et al. | |
| 5,377,372 | A | 1/1995 | Rudolf et al. | |
| 5,388,294 | A | 2/1995 | Reeder | |
| 5,513,406 | A | 5/1996 | Foster et al. | |
| 5,580,207 | A | 12/1996 | Kiebooms et al. | |
| 5,636,394 | A | 6/1997 | Bartley | |
| 5,987,671 | A | 11/1999 | Heimbrock et al. | |
| 6,016,580 | A | 1/2000 | Heimbrock et al. | |
| 6,240,579 | B1 | 6/2001 | Hanson et al. | |
| 6,256,812 | B1 | 7/2001 | Bartow et al. | |
| 6,321,878 | B1 * | 11/2001 | Mobley et al. | 188/1.12 |
| 6,460,205 | B1 | 10/2002 | Lewandowski et al. | |
| 6,725,956 | B1 | 4/2004 | Lemire | |
| 6,729,421 | B1 | 5/2004 | Gluck et al. | |
| 6,752,224 | B2 | 6/2004 | Hopper et al. | |
| 6,772,850 | B1 | 8/2004 | Waters et al. | |
| 6,792,630 | B1 | 9/2004 | Palmatier et al. | |
| 6,834,402 | B2 | 12/2004 | Hanson et al. | |

(Continued)

*Primary Examiner* — Helal A Algahaim
*Assistant Examiner* — Kelly E Darby
(74) *Attorney, Agent, or Firm* — Hanley, Flight & Zimmerman, LLC

(57) ABSTRACT

High centering bases for hospital gurneys are disclosed. An example hospital gurney includes a sensor to detect a position of a foot pedal of the hospital gurney. The example high centering base includes a processor responsive to the sensor to create a movement instruction based on the position of the foot pedal. The example high centering base includes an actuator to move a first wheel based on the movement instruction, the first wheel located between a first end of the hospital gurney and a second end of the hospital gurney.

22 Claims, 10 Drawing Sheets

(56) References Cited

U.S. PATENT DOCUMENTS

| | | | | |
|---|---|---|---|---|
| 6,871,714 | B2 | 3/2005 | Johnson | |
| 7,062,805 | B2 | 6/2006 | Hopper et al. | |
| 7,419,019 | B1 | 9/2008 | White et al. | |
| 7,896,118 | B2 * | 3/2011 | Williamson et al. | 180/209 |
| 8,341,777 | B2 * | 1/2013 | Hensley et al. | 5/424 |
| 8,341,779 | B2 * | 1/2013 | Hornbach et al. | 5/618 |
| 2002/0084116 | A1 | 7/2002 | Ruschke et al. | |
| 2011/0277241 | A1 * | 11/2011 | Schejbal | 5/510 |

* cited by examiner

| | 950 | 960 | 970 | 980 |
|---|---|---|---|---|
| 310 | NOT ACTIVATED | NOT ACTIVATED | ACTIVATED | ACTIVATED |
| 320 | ACTIVATED | NOT ACTIVATED | NOT ACTIVATED | NOT ACTIVATED |
| 330 | NOT ACTIVATED | NOT ACTIVATED | NOT ACTIVATED | ACTIVATED |
| | IN RETRACTED POSITION 955 | MOVE TO RETRACTED POSITION 965 | MOVE TO DEPLOYED POSITION 975 | IN DEPLOYED POSITION 985 |

HIGH CENTERING BASES FOR HOSPITAL GURNEYS

RELATED APPLICATION

This patent claims priority to U.S. Provisional Patent Application Ser. No. 61/637,243, which was filed on Apr. 23, 2012 and is hereby incorporated by reference in its entirety.

FIELD OF THE DISCLOSURE

This disclosure relates generally to gurneys, and, more particularly, to high centering bases for hospital gurneys.

BACKGROUND

Hospitals have long used gurneys to transport and/or treat patients. A gurney includes a bed supported by a gurney base. A typical gurney base includes a wheeled frame that enables a person (e.g., a caretaker, a doctor, a nurse, etc.) to easily move a patient. In many examples, the height of the bed is adjustable to assist in transfer of a patient from a gurney to a fixed hospital bed. In addition to being height adjustable, some gurneys may be moved into different positions (e.g., a supine position, a trendelenburg position, a reverse trendelenburg position, etc.). The height and/or position of some gurneys is adjusted by one or more actuator(s) between the bed and the gurney base such as, for example, a hydraulic actuator, an electronic actuator, etc.

DETAILED DESCRIPTION

Figure 1:
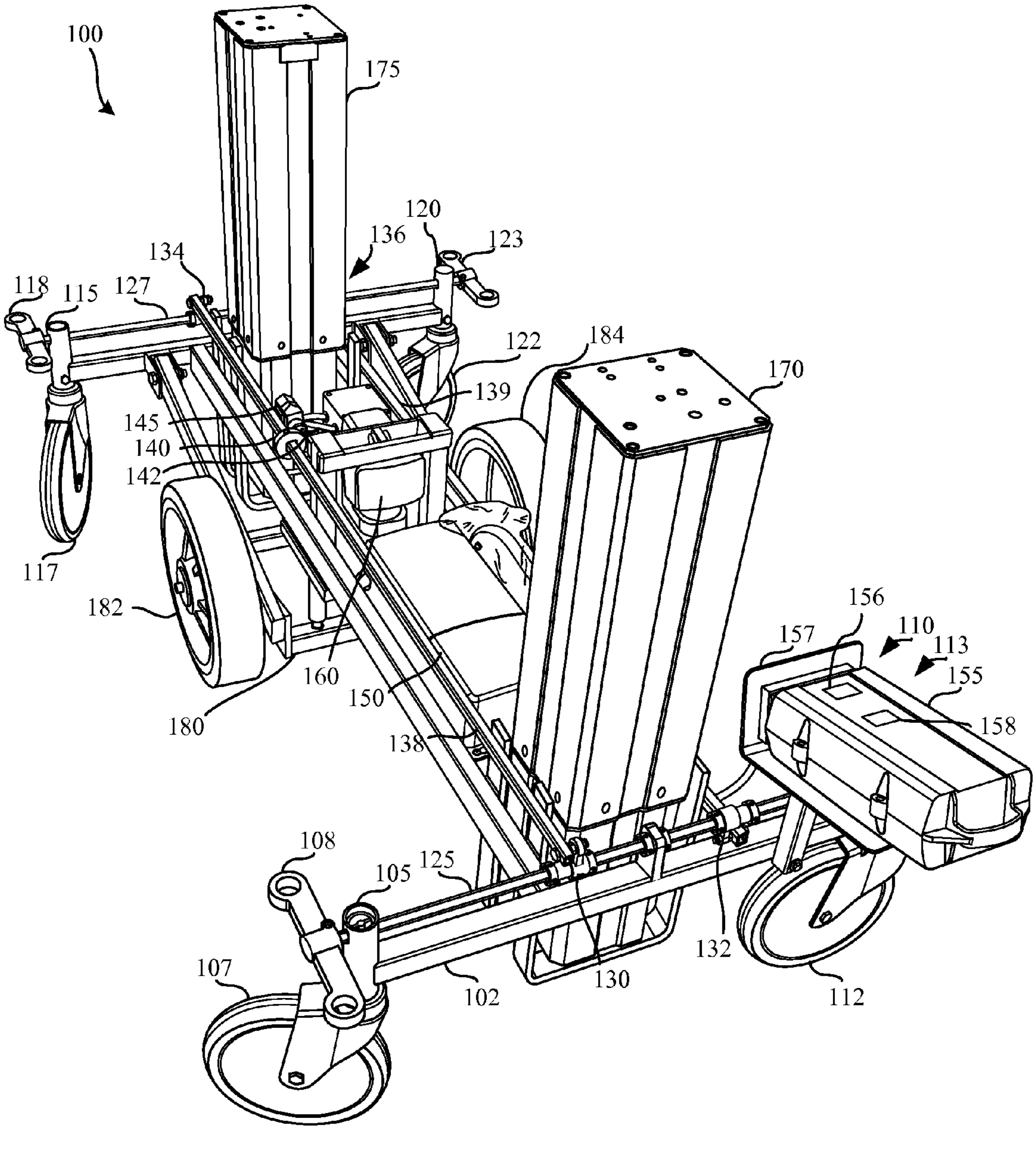
FIG. 1 is a perspective view of an example gurney base constructed in accordance with the teachings of the invention.

Hospitals have long used gurneys to transport and/or treat patients. A gurney includes a wheeled frame that enables hospital staff to easily move a patient. The wheeled frame typically includes four wheels or casters including brakes which, when activated, prevent the gurney from being moved. In some examples, foot pedals attached to the casters or wheels activate the brakes. Activating one foot pedal activates the associated brake and prevents that wheel or caster from moving. The foot pedals are interconnected by a mechanical braking system such that when one foot pedal is moved, the rest of the foot pedals move in synchronization, thereby applying the brakes of each caster or wheel to prevent movement of the gurney.

Unfortunately, many brake systems degrade over time due to slippage, bending, and/or twisted parts, etc. In a degraded brake system, upon the activation of one foot pedal, other pedals may partially engage the brake or not engage the brake at all. This creates a potentially dangerous situation where the hospital staff assumes that the gurney is stationary when, in fact, it is not. If, for example, the hospital staff attempted to move a patient from a gurney having a degraded brake system, the gurney may move, which may result in injury to the hospital staff and/or the patient.

In the examples illustrated herein, the example brake system connects pedals on the same end of the gurney together using a cross member. In known systems, the cross member is a cylindrical tube. In such known systems, when the cross member is rotated by activating a first pedal on a first end of the cylindrical cross member, the rotation is translated to a second pedal on a second end of the cylindrical cross member. Over time, rotational forces exerted on the cross member cause these known cross members to become twisted (e.g., bent around a central axis of the cross member). Such twisting may reduce the amount of force applied to the second pedal when the first pedal is engaged. If, for example, the force applied to the second pedal is reduced, a brake adjacent the second end of the cross member may not be fully engaged.

In examples disclosed herein, the cross member is implemented by a rigid hexagonal tube. Using a rigid hexagonal tube reduces the amount of twisting that will occur over the life of the tube in relation to the known cylindrical tubes. Because such twisting is reduced, the cross member is more likely to apply the same amount of force to the second pedal as is applied to the first pedal for longer than a cylindrical tube in a similar situation, thereby ensuring that the brakes associated with the first and second pedals are properly engaged.

In known gurney systems, the brake system includes a connecting member that connects a first cross rod on a first end of the gurney with a second cross rod on a second end of the gurney. In such known gurneys, the connecting member is a thin piece of cylindrical tubing. The connecting member is connected to the first cross member by a first cam, and is connected to the second cross member by a second cam. In some examples, the cams are referred to as joints, linkages, etc. When the first cross member is rotated, the first cam pushes or pulls the connecting member in the direction of rotation. Consequently, the second cross member of these known gurneys is rotated in the same direction by the force exerted via the second cam. In such known gurneys, the pushing action causes the connecting member to bend. When the connecting member is bent, the brakes of such known gurneys may not be engaged and/or disengaged upon movement of the foot pedals. If the brakes are not completely engaged, such known gurneys may move unexpectedly, which may result in injury to the hospital staff and/or the patient.

In examples disclosed herein, the connecting member is not implemented by cylindrical tubing but is instead implemented by a rigid square tube. A rigid square tube exhibits a lower amount of bending over time than the cylindrical tube which ensures that the wheel locks on opposing ends of the gurney are engaged and/or disengaged as appropriate. In some examples disclosed herein, the rigid square tube is made of cold rolled steel. However, any other material may additionally or alternatively be used.

In examples disclosed herein, a second connecting member connects the first cross member and the second cross member. In some such examples, the first rigid square tube is disposed above the first cross rod and the second cross rod. In some such examples, the second square tube is disposed below the first cross rod and the second cross rod. When the first cross rod is rotated in a first direction, the first rigid square tube pulls the second cross rod in the direction of rotation and the second rigid square tube pushes the second cross rod in the direction of rotation. When the first cross rod is rotated in a second direction opposite the first direction, the first rigid square tube pushes the second cross rod in the direction of rotation and the second rigid square tube pulls the second cross rod in the direction of rotation. Thus, when the first connecting member is being pulled, the second connecting member is being pushed. Conversely, when the first connecting member is being pushed, the second connecting member is being pulled. Because pulling the connecting member is less likely to induce bending, the connecting members experience less wear and will last longer. Because there is tension in both directions of rotation, the brake system disclosed herein allows for better braking control from both ends of the gurney, and thereby ensures that the brakes are completely engaged when appropriate.

Known hospital gurneys may be used to easily transport a patient. Many such known hospital gurneys include four wheels, one at each corner of the hospital gurney. In some examples, these four wheels are each attached to a frame of the hospital gurney via a pivotable connection (e.g., caster). The pivotal connections allow the corresponding wheels to rotate freely about a vertical axis so that the gurney can be moved in multiple directions (e.g., the gurney may be moved sideways, diagonally, etc.).

Known gurneys are usually heavy, and require a significant amount of force to move. Some known systems address this problem by adding a high centering wheel. In some such known system, the high centering wheel has a larger diameter than the rollers at the corners of the gurney. Having a larger diameter results in a lower amount of force required to rotate the high centering wheel. Further, the high centering wheel rotates about a fixed axis, resulting in an increased ease of movement in a forward and backward direction, and an increased ease of turning the gurney. In contrast to the rollers at the respective corners of the gurney, the high centering wheel does not rotate about a vertical axis. Thus, when the high centering wheel is deployed, they gurney cannot be moved sideways.

The high centering wheel of such known gurneys is downwardly deployed, thereby slightly raising the hospital gurney. When the hospital gurney is raised, two of the end rollers are lifted from the ground. That is, the high centering wheel and two of the rollers of the hospital gurney remain on the ground. In such a configuration, the hospital gurney is more easily maneuverable.

In some known systems, the high centering wheel is deployed by mechanical deployment. That is, a pedal associated with deployment of the high centering wheel is pushed to deploy the high centering wheel downward. In known gurneys, the amount of force required to push the wheel downward is very high. In known gurneys, to downwardly deploy the high centering wheel, the gurney and the patient must be lifted. In some cases, the force required may be in excess of five hundred pounds. Exerting such a large force is not easy for hospital staff to accomplish.

In examples disclosed herein, a high centering wheel of a gurney is deployed via an actuator. In some examples, the actuator is a linear actuator that applies an electromechanical force to deploy and/or retract the high centering wheel. However, the actuator 160 may be any other type of actuator such as, for example, a hydraulic actuator, a pneumatic actuator, etc. In the illustrated example, the actuator 160 has a mechanical lockout, which, in the absence of an instruction to move, prevents movement of the actuator. In the illustrated example, the actuator 160 has a stroke of two inches. However, any other stroke length may additionally or alternatively be used.

In some examples, the actuator 160 is controlled by a processing unit that receives a position signal from a sensor. In examples illustrated herein, the position signal represents a position of one or more of the pedals associated with the wheel of the hospital gurney. In the illustrated example, the sensor receives the position of the one or more pedals by detecting the position of the connecting member. Detecting the position of the connecting member enables execution of a logical AND operation, thereby ensuring that the position of each of the pedal is in a deploy position.

In some examples disclosed herein, each of the pedals can be positioned into three distinct positions. In a first position, the pedal(s), engage the brakes. The first position is useful when the hospital gurney is not to be moved. When in the first position, the high centering wheel is not deployed. Indeed deploying the high centering wheel while the brakes are deployed would enable the hospital gurney to move, thereby creating a possibility for injury to the patient and/or the hospital staff. The second position of the pedal(s) is a neutral position, wherein neither the brakes nor the high centering wheel(s) are deployed. The second position is useful when the hospital gurney is to be moved. A third position of the pedal(s) deploys the high centering wheel. The third position is useful when the hospital gurney is to be moved.

FIG. 1 is a perspective view of an example gurney base 100 constructed in accordance with the teachings of the invention. The example gurney base 100 of FIG. 1 includes a frame 102. In the illustrated example, the frame 102 is an ‘I’ shaped frame that extends between the four corners of the hospital gurney. However, any other shape may additionally or alternatively be used. In the illustrated example, the frame 102 is made of rectangular steel tubing. However, any other material in any other shape may additionally or alternatively be used.

Casters are disposed at the four corners of the example frame 102 of the gurney base 100. A first caster includes a first pivotable connection 105 mounting a first roller 107 to the frame 102. A second caster includes a second pivotable connection 110 (which is obstructed from view by a battery 155 in FIG. 1) mounting a second roller 112 to the frame 102. The first caster and the second caster are disposed at a same end of the gurney base 100. A third caster includes a third pivotable connection 115 mounting a third roller 117 to the frame 102. A fourth caster includes a fourth pivotable connection 120 mounting a fourth roller 122 to the frame 102. Each caster enables its respective roller to rotate about a vertical axis. Rotation about the vertical axis enables the hospital gurney to be moved in various directions (e.g., sideways, diagonally, etc.).

Each of the casters includes a brake. When engaged, the brakes prevent movement of the associated roller 107, 112, 117, 122. The brakes of the illustrated example are engaged by turning a pedal associated with the corresponding caster. A first pedal 108 is associated with the first caster. A second pedal 113 (which is obstructed from view by the battery 155 in FIG. 1) is associated with the second caster. A third pedal 118 is associated with the third caster. A fourth pedal 123 is associated with the fourth caster. The pedals 108, 113, 118, and 123 are interconnected via a braking system. Thus, when one pedal is moved, the other three pedals also move in a similar fashion. While in the illustrated example, each caster is associated with a pedal, in some examples one or more of the casters may not be associated with a pedal. For example, each side and/or end of the hospital gurney may have a single pedal.

The braking system of the illustrated example connects the first pedal 108 with the second pedal 113 via a first cross rod 125. The third pedal 118 is connected to the fourth pedal 123 via a second cross rod 127. In the illustrated example, the first cross rod 125 and the second cross rod 127 are made of rigid square tubing. Using rigid square tubing reduces the amount of bending that will occur over time when the pedals are rotated, and ensures that the brakes on opposing ends of the gurney are engaged and/or disengaged as appropriate. In some examples, the first cross rod 125 and the second cross rod 127 are made of cold rolled steel. However, any other material may additionally or alternatively be used.

The first cross rod 125 and the second cross rod 127 of the illustrated example are interconnected via a first connecting member 138 and a second connecting member 139. The first connecting member 138 is connected to the first cross rod 125 via a first cam 130. The second connecting member 139 is connected to the first cross rod 125 via a second cam 132. The first connecting member 138 is connected to the second cross rod 127 via a third cam 134. The second connecting member 139 is connected to the second cross rod 127 via a fourth cam 136 (which is obstructed from view by a height adjustment actuator 175 in FIG. 1). In the illustrated example, the first connecting member 138 is disposed above the first cross rod 125 and the second cross rod 127. The second connecting member 139 is disposed below the first cross rod 125 and the second cross rod 127.

When the first cross rod 125 is rotated in a first direction, the first connecting member 138 is pulled in the first direction of rotation and the second connecting member 139 is pushed in the first direction of rotation. When the first cross rod 125 is rotated in a second direction different from the first direction, the first connecting member 138 is pushed in the second direction of rotation and the second connecting member 139 is pulled in the second direction of rotation. Movement of the first connecting member 138 and/or the second connecting member 139 caused by movement of one of the cross rods 125, 127 is translated to the other cross rod by the connecting members 138, 139. In the illustrated example, the first cross rod 125 and the second cross rod 127 are under constant tension due to the connecting members 138, 139. If, for example, the first cross rod 125 and the second cross rod 127 were not under tension, slack in the braking system could create a situation whereby the brakes on one end of the gurney base 100 are engaged while the brakes on the opposing side of the gurney base 100 are not engaged.

The gurney base 100 of the illustrated example includes two high centering wheels that are larger than the rollers 107, 112, 117, 122. However, any other number, shape, and/or size of wheels may additionally or alternatively be used. For example, a single high centering wheel may be used. In the illustrated example, a first high centering wheel 182 is disposed on a first side of the gurney base 100. A second high centering wheel 184 is disposed on a second side of the gurney base 100 opposite the first side. In the illustrated example, the first high centering wheel 182 and the second high centering wheel 184 are disposed inside of a perimeter of the gurney base as defined by the rollers 107, 112, 117, 122. In the illustrated example, the first high centering wheel 182 and the second high centering wheel 184 are disposed closer to one end of the gurney base 100 than the other end of the base 100. In some examples, the high centering wheels are on the same end of the gurney as the torso of the patient. The torso is usually the heaviest part of the patient. Thus, placing the high centering wheels on the same end of the gurney as the torso of the patient reduces the likelihood that the gurney base will abruptly rock back and forth between one end and another. Abruptly rocking back and forth may be uncomfortable for the patient.

In the illustrated example, the high centering wheels are attached to a high centering wheel frame 180. The high centering wheel frame 180 is attached to one end of the frame 102 and pivots about the attachment point. In the illustrated example, the high centering wheels 182, 184 are deployed and/or retracted by applying a force to the high centering wheel frame 180. In the illustrated example, the force is applied to the high centering wheel frame 180 by an actuator 160. In the illustrated example, the actuator 160 is an electrically driven linear actuator. However, any other type(s) and/or numbers of actuator(s) may additionally or alternatively be used. In the illustrated example, the actuator 160 has a rating of nine hundred pounds of force. Nine hundred pounds of force is typically enough force to lift the patient and the hospital gurney. However, an actuator rated for any other amount of force may additionally or alternatively be used. For example, an actuator rated for fifteen hundred pounds of force may be used in a hospital gurney designed for bariatric patients.

The movement of the actuator 160 is controlled by a processing unit 150. The processing unit 150 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The processing unit 150 of the illustrated example receives inputs from one or more of a lift actuation sensor, an upper limit sensor, a lower limit sensor, and a keypad. However, any other types and/or number of inputs may additionally or alternatively be used. Based on the received inputs, the processing unit 150 sends an instruction (e.g., a movement instruction) to the actuator 160 to deploy and/or retract the high centering wheels 182, 184. In some examples, the processing unit 150 sends an instruction to a first height adjustment actuator 170 and/or a second height adjustment actuator 175.

In some examples, the processing unit 150 receives an input from the keypad to actuate the first height adjustment actuator 170 and/or the second height adjustment actuator 175 to raise and/or lower the patient-supporting surface of the gurney. However, the illustrated example, the keypad is not used to control the deployment and/or retraction of the high centering wheels 182, 184. The height adjustment actuators 170, 175 may be moved in tandem to raise and/or lower the patient. Alternatively, the height adjustment actuators 170, 175 may be moved to different heights to place the patient into different positions (e.g., a supine position, a trendelenburg position, a reverse trendelenburg position, etc.).

The processing unit 150, the actuator 160, the first height adjustment actuator 170, and/or the second height adjustment actuator 175 are powered by a battery 155. In the illustrated example, the battery 155 is a twenty-four volt battery. However, any other battery and/or voltage may additionally or alternatively be used. In the illustrated example, the battery 155 includes a fifteen-ampere fuse 156. The fifteen-ampere fuse 156 protects against damage to the battery 155, the processing unit 150, the actuator 160, the first height adjustment actuator 170, and/or the second height adjustment actuator 175. When the fuse is tripped (e.g., blown) by current exceeding fifteen amperes, the battery 155 will not supply power and consequently, the actuator 160, the first height adjustment actuator 170, and/or the second height adjustment actuator 175 will not move. When the power is removed in this manner, the actuator 160, the first height adjustment actuator 170, and/or the second height adjustment actuator 175 are locked in place. In some examples, the fuse 155 may be tripped when one or more of the actuator 160, the first height adjustment actuator 170, and/or the second height adjustment actuator 175 are simultaneously drawing power from the battery 155. In such circumstances, the fuse must be replaced.

To reduce tripping of the fuse 156, in the illustrated example, the battery 155 additionally includes a twelve-ampere time-delay auto-reset circuit breaker 158. The circuit breaker 158 prevents current spikes from damaging the battery 155, the processing unit 150, the actuator 160, the first height adjustment actuator 170, and/or the second height adjustment actuator 175. When the circuit breaker is tripped by current exceeding twelve amperes, the circuit breaker waits for a period of time (e.g., one second, two seconds, etc.) and then resets. In many cases, using the time-delay auto-reset circuit breaker results in the hospital gurney 100 returning to normal operation without intervention by hospital staff and/or a technician.

In the illustrated example, the battery 155 is received by a battery receiver 157. The battery receiver 157 enables the battery 155 to be removed from the gurney base 100 and/or otherwise replaced. Removing the battery 155 may be necessary to allow the battery 155 to be charged.

In the illustrated example, the processing unit 150 sends an instruction to the actuator 160 in response to a sensor housed inside the lift actuation sensor housing 145. The sensor is shown as the lift actuation sensor 310 in FIG. 3 and is described in further detail in association with FIG. 3. The sensor detects a position of one or more of the pedals 108, 113, 118, 123. In the illustrated example, the sensor is implemented by a micro switch. However, any other type(s) and/or number of sensor may additionally or alternatively be used. In the illustrated example, the micro switch is toggled between an activated and deactivated position by a lift actuation paddle 142. In the illustrated example, the lift actuation paddle 142 is connected to the first connecting member 138 via the adjustable paddle connector 140.

The adjustable paddle connector 140 of the illustrated example adjustably attaches to the first connecting member 138 using set screws. However, any other way of adjustably attaching the adjustable paddle connector 140 to the first connecting member 138 may additionally or alternatively be used. Further, the paddle connector 140 may be permanently attached to the first connecting member 138 by, for example, welding. In the illustrated example, the lift actuation paddle 142 is attached to the adjustable paddle connector 140 by a weld. However, any other method of attaching the lift actuation paddle 142 to the adjustable paddle connector 140 may additionally or alternatively be used.

While in the illustrated example the sensor senses the position of the one or more of the pedals 108, 113, 118, 123 by detecting a position of the first connecting member 138 any other manner of detecting the position of the one or more of the pedals 108, 113, 118, 123 may additionally or alternatively be used such as, for example, detecting the rotation of the first cross rod 125 and/or the second cross rod 127.

Figure 2:
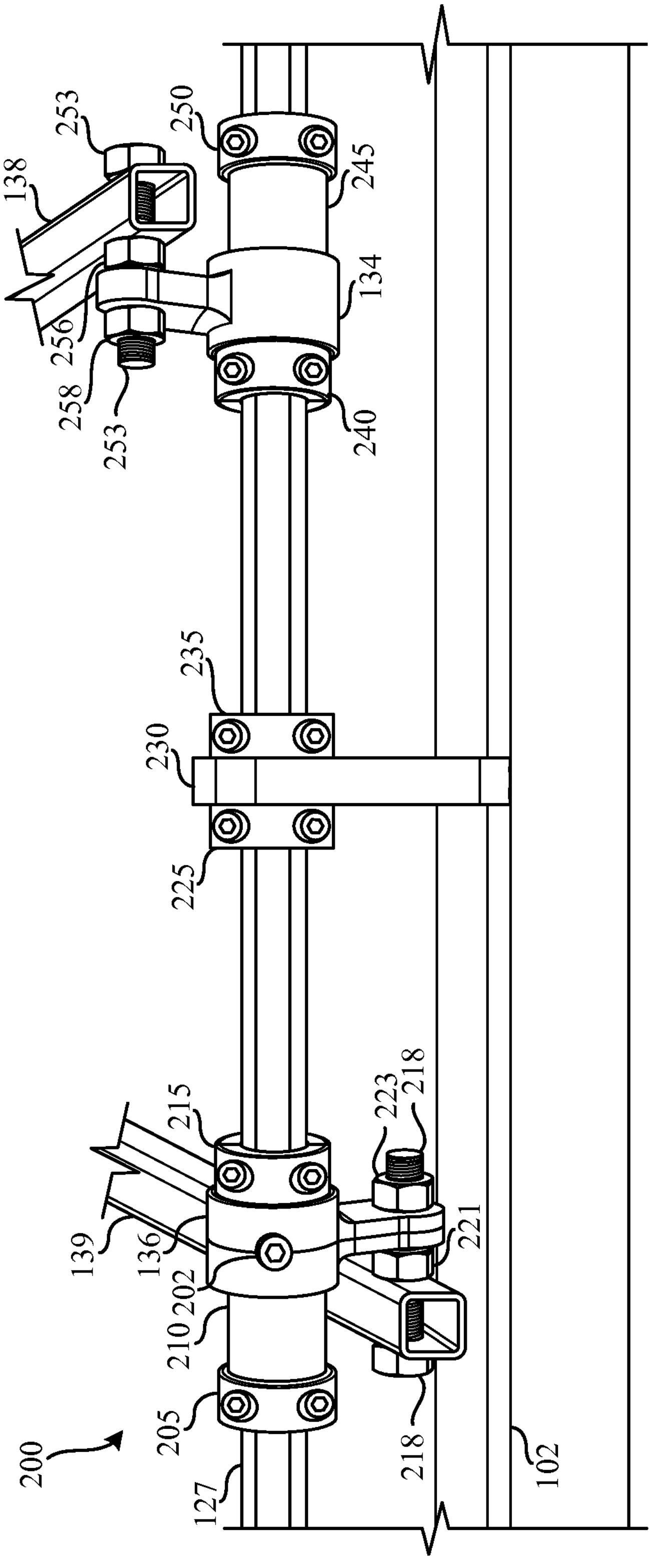
FIG. 2 is a side view of an example cross rod of the gurney base of FIG. 1.

FIG. 2 is a side view 200 of the example cross rod 127 of the gurney base 100 of FIG. 1. The side view 200 of FIG. 2 represents the far end of the gurney 100 of FIG. 1. In the illustrated example, the frame 102, the second cross rod 127, the first connecting member 138, the second connecting member 139, the third cam 134, and the fourth cam 136 are shown. While in the illustrated example, one end of the hospital gurney 100 is shown, it should be understood that a similar configuration is used at the opposite end of the hospital gurney 100.

As previously described, the second cross rod 127 is a hexagonal tube. However, any other shape of rod or tube may additionally or alternatively be used such as, for example, a hexagonal rod, a square tube, a square rod, a cylindrical tube, etc. In the illustrated example, the third cam 134 and the fourth cam 136 fit around the perimeter of the cross rod 127. In the illustrated example, the cams 134, 136 have a circular interior and therefore rotate freely about the cross rod 127. To ensure that the cams 134, 136 rotate about the axis of the cross rod 127 in synchronization with the cross rod 127, a set screw 202 is used. The set screw 202 is screwed through the cam and tightens against a surface of the cross rod 127. Other set screws are used on the first cam 130, the second cam 132, and the third cam 134 in an analogous manner. While, in the illustrated example the set screw 202 is used to ensure that the cams 130, 132, 134, 136 synchronously rotate with the cross rods 125, 127, any other way of ensuring synchronous rotation may additionally or alternatively be used. For example, the cams 130, 132, 134, 136 may have an inner surface shaped to create an interference fit with the shape of the cross rods 125, 127, the cams 130, 132, 134, 136 may be welded to the cross rods 125, 127, etc.

In addition to rotating about an axis of the cross rods 125, 127, the cams are laterally secured to the cross rods. In the illustrated example of FIG. 2, the fourth cam 136 is held in position by a first collar 205 and a second collar 215. The first collar 205 and the second collar 215 are secured to the cross rod 127 by set screws. However, any other method of securing the collar(s) to the rod(s) may additionally or alternatively be used. To enable the cam 136 to freely move the connecting member 139 without interference from the collars 205, 215, a spacer 210 is used. In the illustrated example, the spacer 210 is made of a cylindrical tubing, however any shape may additionally or alternatively be used.

The cam 136 is secured to the connecting member 139 via a threaded bolt 218. While in the illustrated example, the threaded bolt 218 is used to secure the connecting member 139 to the cam 136, any other method of securing the connecting member 139 to the cam 136 may additionally or alternatively be used. The threaded bolt 218 passes through the connecting member 139 and the cam 136. Advantageously, because the connecting member 139 is made of square tubing, an opening in the connecting member 139 is more easily made than when the connecting member 139 is, for example, cylindrical. Between the cam 136 and the connecting member 139 is a first nut 221. The first nut 221 is threaded onto the threaded bolt 218 and spaces the connecting member 139 away from the cam 136. Because of the spacing created by the first nut 221, the cam 136 and the connecting member 139 are able to move freely without binding against each other. A second nut 223 is threaded onto the threaded bolt 218 adjacent the cam 136. The second nut 223 prevents the threaded bolt 218 from becoming disengaged from the cam 136.

In the illustrated example, a brace 230 is attached to the frame 102 approximately at a midpoint of the cross rod 127. The cross rod 125 passes through an opening of and is supported by the brace 230. In the illustrated example, the brace 230 prevents the cross rod 127 from moving in a direction other than rotationally around the axis of the cross rod 127. For example, the brace 230 prevents vertical drooping near the midpoint of the cross rod 127. If, for example, the cross rod 127 was to droop near the midpoint of the cross rod 127, one or more of the brakes might not be properly engaged and/or disengaged.

In the illustrated example a third collar 225 and a fourth collar 235 are secured to the cross rod 127 on opposite sides of the brace 230. The collars 225, 235 are secured to the cross rod 127 by set screws. However, any other method of securing the collars 225, 235 to the cross rod 127 may additionally or alternatively be used. The collars 225, 235 prevent horizontal movement of the cross rod 127. If the cross rod 127 were allowed to move, any number of problems may occur. For example, the connecting members 138, 139 might be moved such that the lift actuation sensor of FIG. 1 is not properly engaged, the connecting members 138, 139 might be moved such that they interfere with the movement of the height adjustment actuator 170, 175.

In the illustrated example of FIG. 2, the third cam 134 is held in position by a fifth collar 240 and a sixth collar 250. The fifth collar 240 and the sixth collar 250 are secured to the cross rod 127 by set screws. However, any other method of securing the collar(s) to the rod(s) may additionally or alternatively be used. To enable the cam 134 to freely move the connecting member 138 without interference from the collars 240, 250, a spacer 245 is used. In the illustrated example, the spacer 245 is made of cylindrical tubing. However, a tube or rod of any shape may additionally or alternatively be used.

The cam 134 of the illustrated example is secured to the connecting member 138 via a threaded bolt 253. While in the illustrated example, the threaded bolt 253 is used to secure the connecting member 138 to the cam 134, any other method of securing the connecting member 138 to the cam 134 may additionally or alternatively be used. The threaded bolt 253 passes through the connecting member 138 and the cam 134. Between the cam 134 and the connecting member 138 is a third nut 256. The third nut 256 is threaded onto the threaded bolt 253 and spaces the connecting member 138 away from the cam 134. Because of the spacing created by the third nut 256, the cam 134 and the connecting member 138 are able to move freely without binding against each other. A fourth nut 258 is threaded onto the threaded bolt 253 adjacent the cam 134. The fourth nut 258 prevents the threaded bolt 253 from becoming disengaged with the cam 134.

Figure 3:
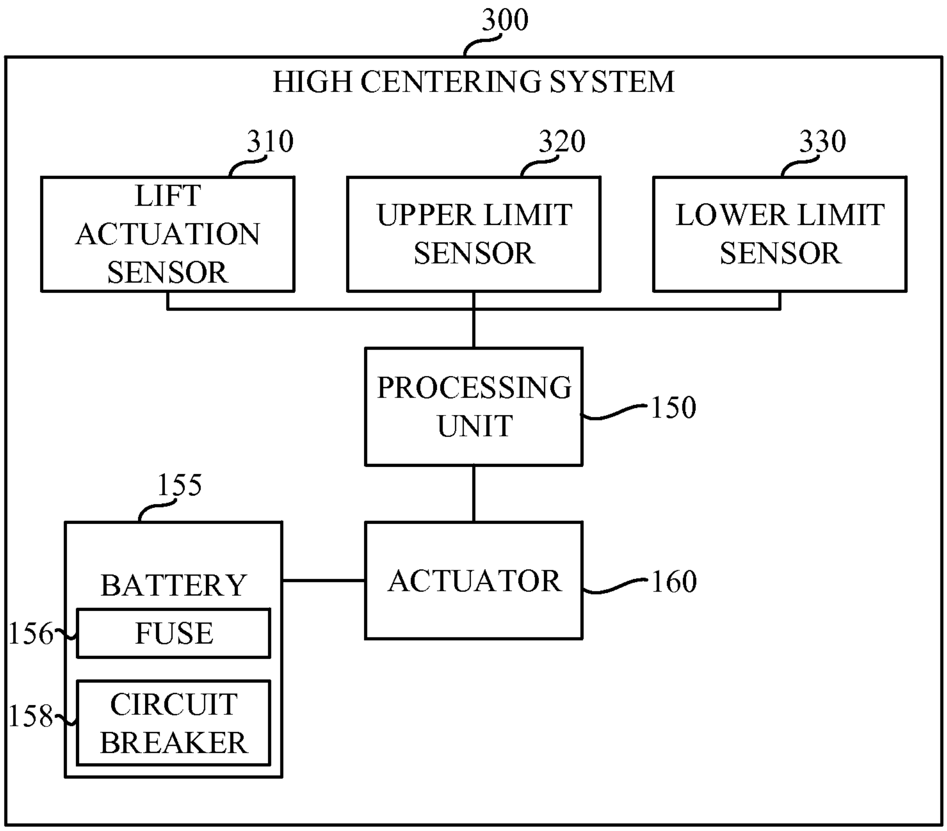
FIG. 3 is a block diagram of the example high centering system of FIG. 1.

FIG. 3 is a block diagram of the example high centering system 300 of FIG. 1. The example high centering system 300 of FIG. 3 includes a lift actuation sensor 310, an upper limit sensor 320, a lower limit sensor 330, the processing unit 150, the battery 155, and the actuator 160.

The example lift actuation sensor 310 of the illustrated example of FIG. 3 is a micro switch that is activated by a plunger. However, any other type of sensor may additionally or alternatively be used. For example, a mercury switch, an accelerometer, a pressure switch, an optical switch, etc. may be used. In the illustrated example, the lift actuation sensor 310 detects a position of a pedal of the hospital gurney base 100 by detecting a position of the lift actuation paddle 142 that moves based on the position of the pedal. However, any other method of detecting the position of the pedal may additionally or alternatively be used. For example, an accelerometer associated with the pedal may detect the position of the pedal.

The example upper limit sensor 320 of the illustrated example of FIG. 3 is a micro switch that is activated by a plunger. However, any other type of sensor may additionally or alternatively be used. For example, a mercury switch, an accelerometer, a pressure switch, an optical switch, etc. may be used. In the illustrated example, the upper limit sensor 320 detects a position of the high centering wheel frame 180. Based on the position of the high centering wheel frame 180 detected by the upper limit sensor 320, the processing unit 150 sends an instruction to the actuator 160 to either move the high centering wheel frame 180 upward or to cease movement.

The example lower limit sensor 330 of the illustrated example of FIG. 3 is a micro switch that is activated by a plunger. However, any other type of sensor may additionally or alternatively be used. For example, a mercury switch, an accelerometer, a pressure switch, an optical switch, etc. may be used. In the illustrated example, the lower limit sensor 330 detects a position of the high centering wheel frame 180. Based on the position of the high centering wheel frame 180 detected by the lower limit sensor 330, the processing unit 150 sends an instruction to the actuator 160 to either move the high centering wheel frame 180 downwards or to cease movement.

While in the illustrated example limit sensors 320, 330 are used to detect the position of the high centering wheels 182, 184, any other method of detecting the position of the high centering wheels 182, 184 may additionally or alternatively be used. For example, the processing unit 150 may receive a position signal from the actuator 160 indicating a present position of the actuator 160 (e.g., extended, retracted, etc.). In some examples, the limit switches may be eliminated (e.g., if the stroke of the actuator is selected to be within the desired operating range so that the sensors are not needed to restrict/control movement). In some examples, the processing unit 150 receives a position signal from a source other than the example limit sensors 320, 330 (e.g., a position signal received from the actuator 160). In such examples, the example limit sensors 320, 330 may also be omitted. In some such examples, the example actuator 160 may have a shortened stroke of, for example, one inch. In such an example, the example actuator 160 may transmit a position signal to the processing unit 150 (e.g., via a variable resistance level corresponding to a position of the actuator 160, via a voltage corresponding to the position of the actuator 160, via a current spike once a position is reached by the actuator 160, etc.)

Figure 4:
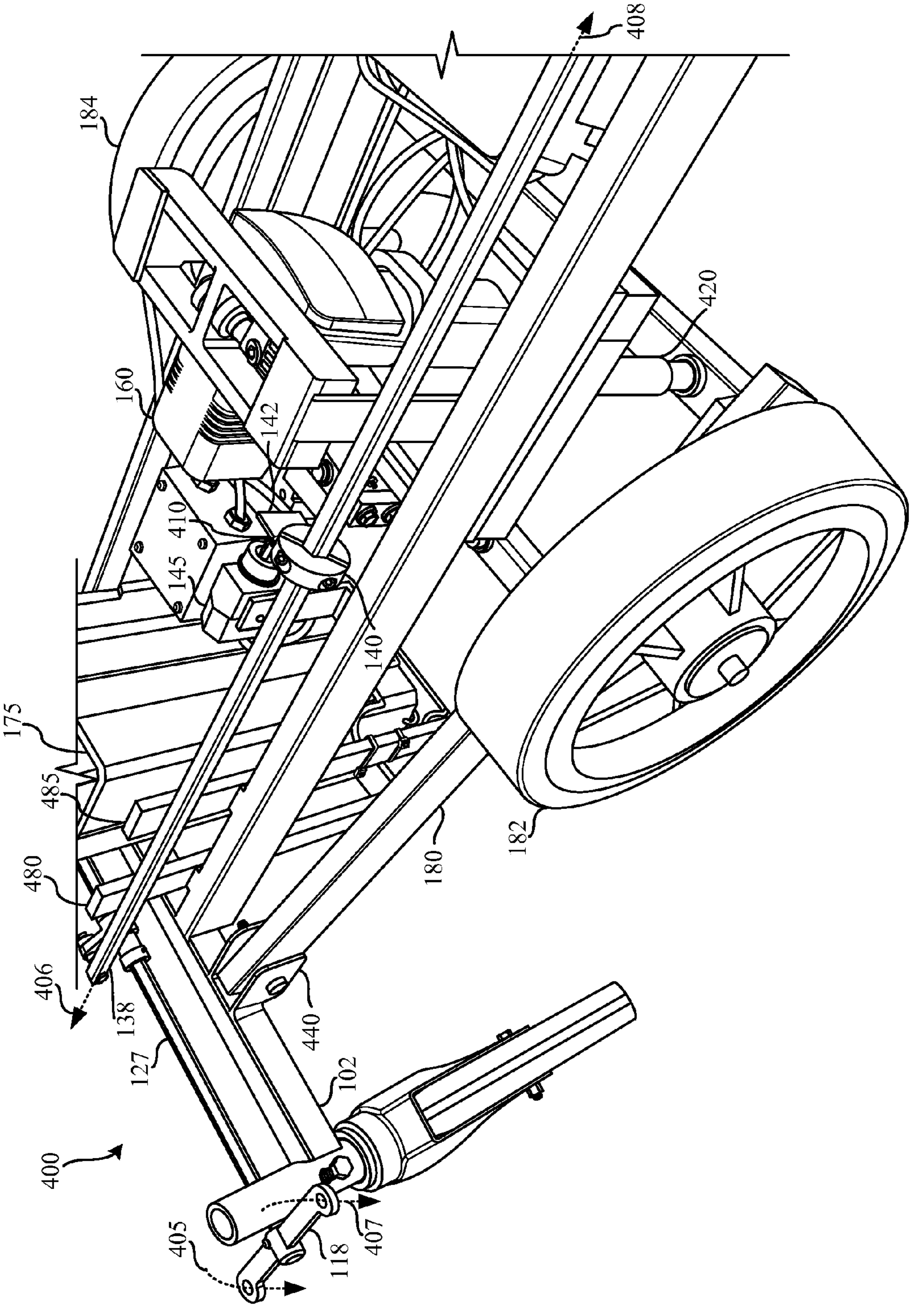
FIG. 4 is a side perspective view of the example gurney base of FIG. 1 showing an example activation bumper of the example high centering system of FIG. 3.

FIG. 4 is a side perspective view 400 of the example gurney base of FIG. 1 showing the example high centering system 300 of FIG. 3. In the illustrated example, the lift activation paddle 142 is coupled to the adjustable paddle connector 140, and thereby the connecting member 138. When moved, the lift actuation paddle 142 depresses and/or releases a lift actuation plunger 410 connected to the lift actuation sensor 310.

When the pedal 118 is rotated in a first rotational direction 405 (e.g., counter clockwise), the connecting member 138 is moved in a first lateral direction 406. The lift actuation paddle 142 is moved in the first lateral direction 406, thereby depressing the lift actuation plunger 410 and activating the lift actuation sensor 310. In response to the lift actuation sensor 310 being activated, the processing unit 150 instructs the actuator 160 to deploy the high centering wheel(s) 182, 184.

When the pedal 118 is rotated in a second rotational direction 407, the connecting member 138 is moved in a second lateral direction 408. The lift actuation paddle 142 is moved in the second lateral direction 408, thereby releasing the lift actuation plunger 410 and de-activating the lift actuation sensor 310. In response to the lift actuation sensor 310 being de-activated, the processing unit 150 instructs the actuator 160 to retract the high centering wheel(s) 182, 184.

In the illustrated example, the actuator 160 is connected to the high centering wheel frame 180 by an actuator shaft 420. The high centering wheel frame 180 is coupled to the frame 102 by a hinge 440. When the actuator 160 deploys and/or retracts the high centering wheels 182, 184, the actuator shaft 420 is moved upward or downward, respectively, causing the high centering wheel frame 180 to rotate about the hinge 440.

In the illustrated example, a first guard 480 and a second guard 485 are attached to the frame 102. The guards 480, 485 support the height adjustment actuator 175. The guards 480, 485 of the illustrated example are 'U' shaped. In the illustrated example, the guards 480, 485 extend beyond a height of the connecting member 138. Extending the guards 480, 485 beyond the height of the connecting member 138 prevents sideways movement of the connecting member 138 from interfering with the operation of the height adjustment actuator 175. In some examples, similar guards are used in association with the height adjustment actuator 170. In the illustrated example, the guards 480, 485 additionally extend beyond a height of the connecting member 139, located on the opposite side of the height adjustment members 170, 175 from the connecting member 138.

Figure 5:
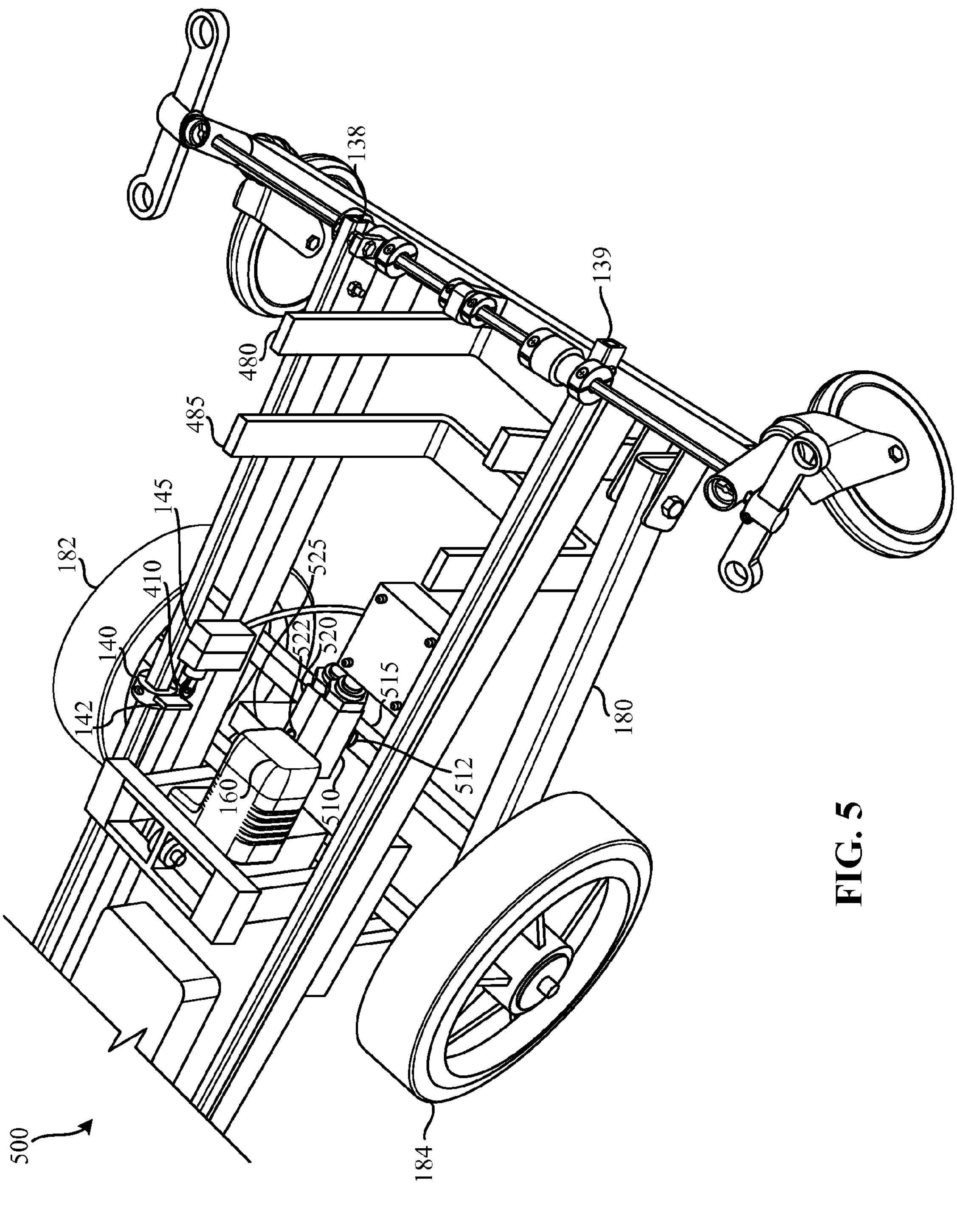
FIG. 5 is a top perspective view of the example gurney base of FIG. 1 showing a lift activation sensor, an upper limit sensor, and a lower limit sensor of the example high centering system of FIG. 3.

FIG. 5 is a top perspective view 500 of the example gurney base 100 of FIG. 1 showing the lift activation sensor housing 145, an upper limit sensor housing 510, and a lower limit sensor housing 520. When the high centering wheels 182, 184 are retracted, the actuator 160 moves the high centering wheel frame 180 upwards until the upper limit sensor 320 is activated. The upper limit sensor 320 is housed in the upper limit sensor housing 510. The upper limit sensor housing 510 includes an upper limit plunger 512 that activates the upper limit sensor 320 when the upper limit plunger 512 is in contact with an upper limit trigger surface 515. In the illustrated example, the upper limit trigger surface 515 is a section of the high centering wheel frame 180. However, any other surface may additionally or alternatively be used, such as, for example, an extension of the high centering wheel frame 180. Further, in the illustrated example, the upper limit sensor housing 510 is stationary with respect to the frame 102. However, in some examples, the upper limit sensor housing 510 may be stationary with respect to any other part of the gurney base. For example, the upper limit sensor housing 510 may be stationary with respect to the high centering wheel frame 180.

When the high centering wheels 182, 184 are deployed, the actuator 160 moves the high centering wheel frame 180 downwards until the lower limit 330 sensor is activated. The lower limit sensor 330 is housed in the lower limit sensor housing 520. The lower limit sensor housing 520 includes a lower limit plunger 522 that activates the lower limit sensor 330 when the lower limit plunger 522 is in contact with a lower limit trigger surface 525. In the illustrated example, the lower limit trigger surface 525 is a bracket attached to the high centering wheel frame 180. However, any other surface connected in any other way may additionally or alternatively be used. Further, in the illustrated example, the lower limit sensor housing 520 is stationary with respect to the frame 102. However, in some examples, the lower limit sensor housing 520 may be stationary with respect to any other part of the gurney base. For example, the lower limit sensor housing 520 may be stationary with respect to the high centering wheel frame 180.

Figure 6:
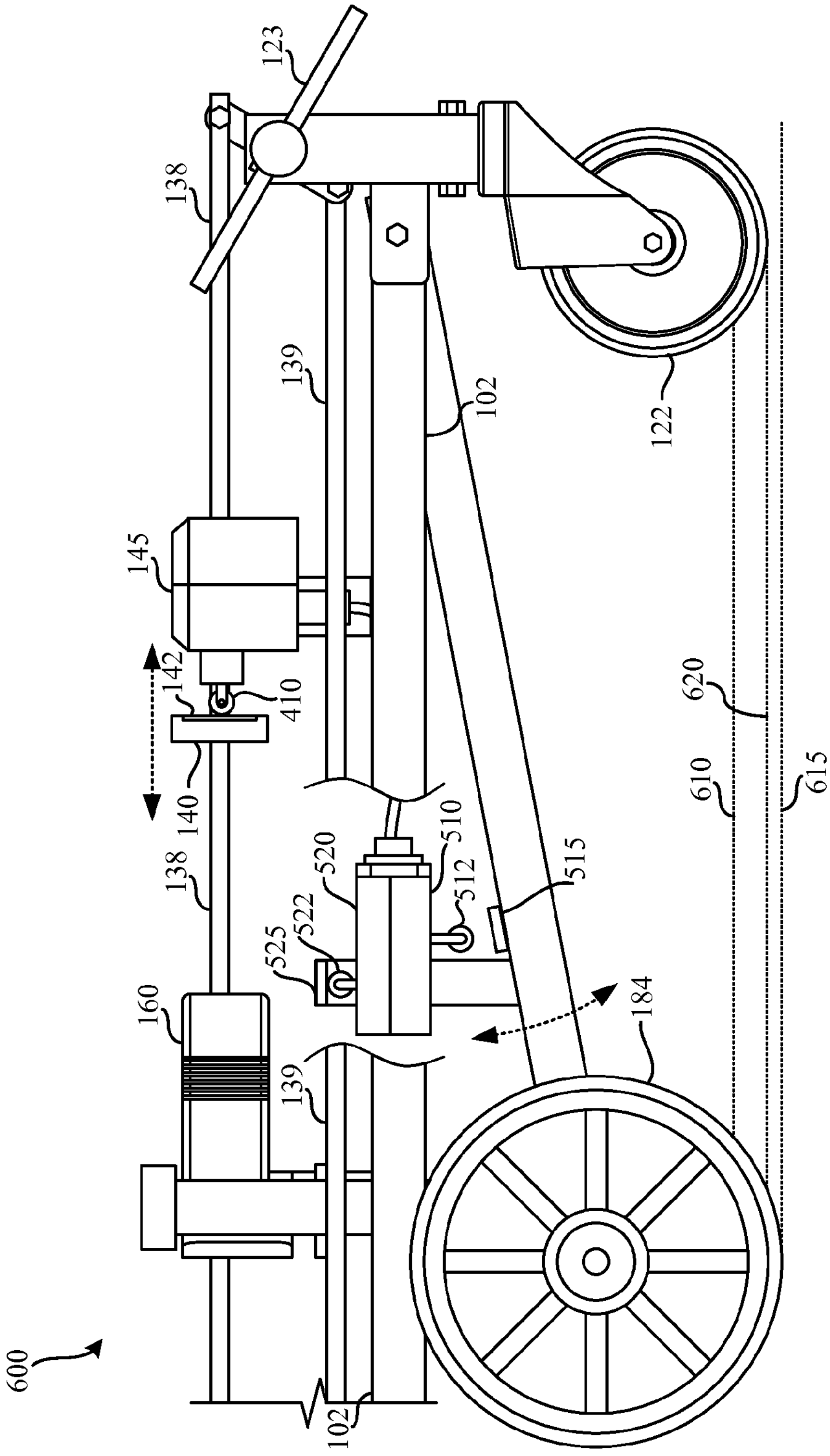
FIG. 6 is a side view of the example gurney base of FIG. 1 showing an actuator, the lift activation sensor, the upper limit sensor, and the lower limit sensor of the example high centering system of FIG. 3.

FIG. 6 is a side view of the example gurney base of FIG. 1 showing the actuator 160, the lift activation sensor housing 145, the upper limit sensor housing 510, and the lower limit sensor housing 520 of the example high centering system. In the illustrated example of FIG. 6, the high centering wheel 184 is deployed. In the illustrated example, the pedal 123 is rotated into a 'deploy high centering wheel' position. The cross rod associated with the pedal 123 is rotated, thereby pulling the first connecting member 138 and pushing the second connecting member 139. The adjustable paddle connector 140 moves the actuation paddle 142 which depresses the lift actuation plunger 410.

Because the lift actuation plunger 410 is depressed, the lift actuation sensor 310 is activated, causing the processing unit 150 to instruct the actuator 160 to deploy the high centering wheel 184. The high centering wheel 182 is moved downward until the lower limit sensor 330 is activated. The lower limit sensor 330 is activated when the lower limit trigger surface 525 (which moves down as the actuator lowers the wheel 184) depresses the lower limit sensor plunger 522. When the lower limit sensor plunger 522 is depressed, the lower limit sensor 330 is activated. When the lower limit sensor 330 is activated, the actuator 160 ceases movement. In the illustrated example, the high centering wheel 184 is then in a deployed state with a lower point of the wheel 184 at a point 615 that is below a plane 620 formed by the lowest points of each of the rollers 107, 112, 117, 122.

If, for example, the pedal 123 is moved into a neutral state (e.g., a horizontal position), the lift actuation plunger 410 will no longer be depressed and the lift actuation sensor 310 will not be activated, causing the processing unit 150 to instruct the actuator 160 to retract the high centering wheel 184. The high centering wheel 184 is refracted until the upper limit sensor 320 is activated. The upper limit sensor 320 is activated when the upper limit trigger surface 515 (which moves upward as the actuator raises the wheel 184) depresses the upper limit sensor plunger 512. When the upper limit sensor plunger 512 is depressed, the upper limit sensor 320 is activated. When the upper limit sensor 320 is activated, the actuator 160 ceases movement. In the illustrated example, the high centering wheel 184 is then in a retracted state and is at a point 610 that is above the plane 620.

Figure 7:
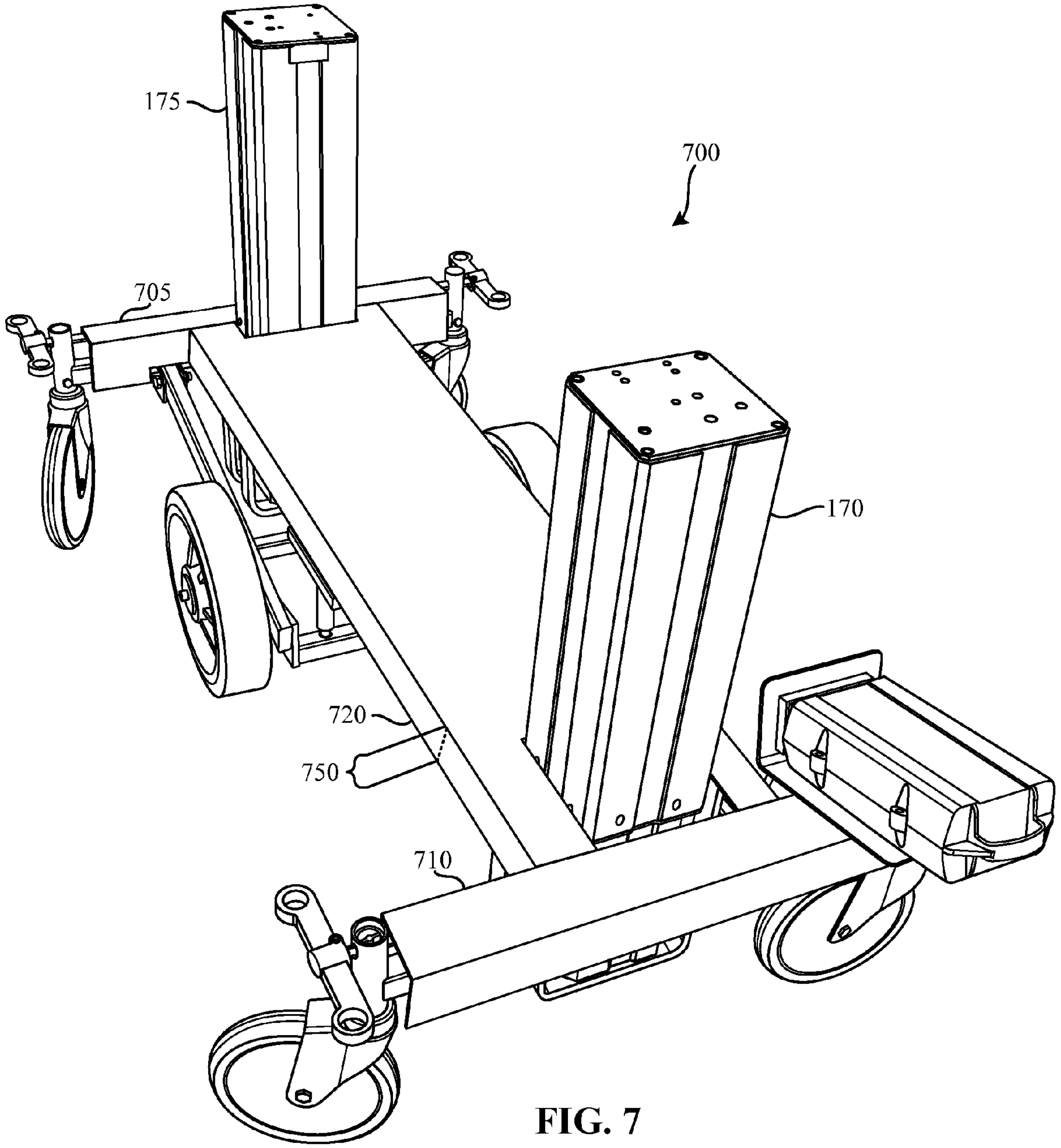
FIG. 7 is a perspective view of the example gurney base of FIG. 1 including a gurney base cover.

FIG. 7 is a perspective view 700 of the example gurney base of FIG. 1 including a gurney base cover. The gurney base cover of the illustrated example includes multiple sections. The hospital gurney base 100 may be hidden by the cover to, for example, improve an appearance of the hospital gurney base 100, protect components of the hospital gurney base 100, protect hospital staff, patients, etc. from injury as a result of the components of the hospital gurney 100, etc. In some prior systems, the cover is formed from a single piece of material and/or is formed from multiple pieces of material that are not separable. In some known systems, the cover includes two apertures to allow height adjustment actuators to be attached to a bed of the hospital gurney.

In the event of a malfunction of a hospital gurney base, a technician inspects the components of the hospital gurney base to repair the hospital gurney base. In some known instances, the cover is difficult to remove because removal of the cover requires removal of the bed attached to the height adjustment actuators prior to removal of the cover.

In the illustrated example, the cover includes multiple sections. In the illustrated example, a first cover section 705 covers a first end of the hospital gurney base and is attached to the frame 102 of the hospital gurney base 100. In the illustrated example, a second cover section 710 covers a second end of the hospital gurney base different than the first end, and is attached to the frame 102. In the illustrated example, the first cover section 705 and the second cover section 710 are attached to the frame 102 by nuts and bolts. However, any other method of fastening and/or attaching the cover sections 705 and 710 may additionally or alternatively be used such as, for example, welding, etc.

In the illustrated example, the cover includes a removable center section 720. The removable center section 720 can be removed without needing to first remove the hospital bed from the hospital gurney base 100. In the illustrated example, the removable center section 720 extends from the first cover section 705 to the second cover section 710. Further, the removable center section 720 includes cutouts for the height adjustment actuators 170, 175. However, in some examples, the removable center section 720 extends from the first height adjustment actuator 170 to the second height adjustment actuator 175. In such an example, the sections of the removable center section 720 shown at the sides of the height adjustment actuators 170, 175 may be included as part of the first cover section 705 and/or the second cover section 710.

Faults and/or problems that result in maintenance may include electrical faults (e.g., a disconnected contact, a non-functioning processing unit, etc.) and/or mechanical faults (e.g., twisted and/or broken parts, misaligned parts, etc.). In some examples, the hospital bed may be in a lowered state (e.g., the height adjustment actuators 170, 175 may be at their lowest state, etc.). When the hospital bed is in the lowered state, removal of the removable center section 720 depends on the height of the removable center section 720 because, in some examples, the height adjustment actuators 170, 175 might not be able to be raised. If, for example, the hospital bed was lowered to a point where removal of the removable center section 720 required the hospital bed to be raised, full disassembly of the gurney may be necessary. In the illustrated example, a height 750 of the removable center section 720 is less than the difference in height of the bottom of the hospital bed (e.g., the top of the height adjustment actuators 170, 175, etc.) and the highest point of the hospital gurney base 100 (e.g., the top of the actuator 160, etc.).

Figures 8, 9:
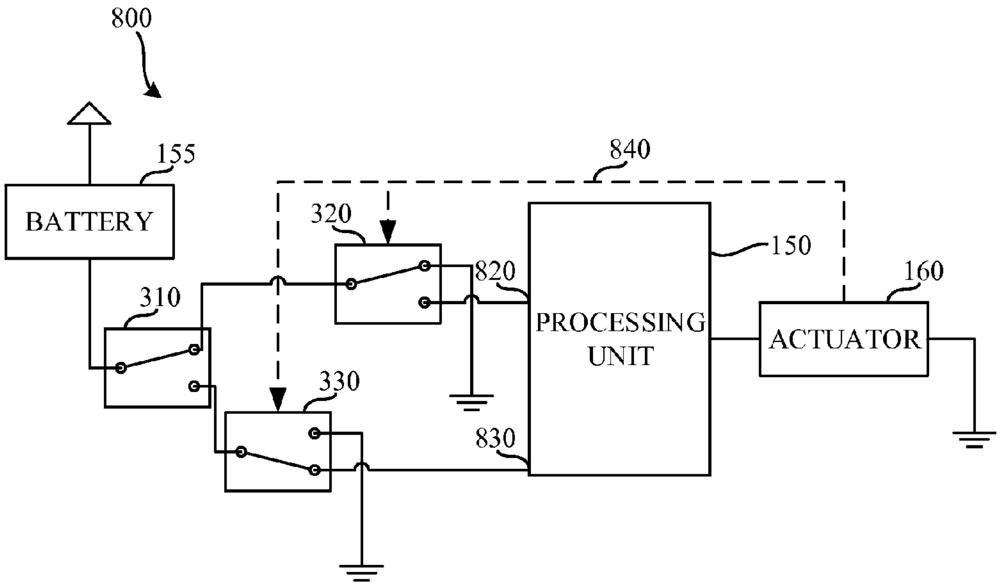
FIG. 8 is a schematic diagram of an example implementation of the example high centering system of FIG. 3.
FIG. 9 is a state diagram of the example high centering system 300 of FIGS. 3 and/or 8.

FIG. 8 is an example schematic diagram 800 of the example high centering system 300 of FIG. 3. The example schematic diagram 800 includes the lift actuation sensor 310, the upper limit sensor 320, the lower limit sensor 330, the processing unit 150, and the actuator 160. In the illustrated example of FIG. 8, the example lift actuation sensor 310, the example upper limit sensor 320, and the example lower limit sensor 330 are represented as switches. In the illustrated example, the example upper limit sensor 320, and the example lower limit sensor 330 receive a feedback signal 840 based on the position of shaft 420 of the linear actuator 160.

In the illustrated example of FIG. 8, the battery 155 provides a voltage to the lift actuation sensor 310. However, the lift actuation sensor 310 may receive power via any other source such as, for example, an output of the processing unit, etc. When the lift actuation sensor 310 is activated (as shown in the illustrated example of FIG. 8), the lift actuation sensor 310 forms a closed circuit with respect to the upper limit sensor 320. While the lift actuation sensor 310 is activated, the wheels 182, 184 move upward unless the upper limit sensor 320 is activated (e.g., when the wheels 182, 184 are in a retracted position). Thus, the upper limit sensor 320 detects whether the wheels 182, 184 are in the retracted position and closes or opens a connection between the lift actuation sensor 310 and the processing unit 150 based thereon. If the upper limit sensor 320 is activated (as shown in the illustrated example of FIG. 8), the upper limit sensor 320 open the circuit between the lift actuation sensor 310 and the processing unit 150. In the illustrated example, the upper limit sensor 320 forms a closed circuit between the lift actuation sensor 310 and ground. Alternatively, if the upper limit sensor 320 is not activated, the upper limit sensor 320 forms a closed circuit between the lift actuation sensor 310 and a first input 820 of the processing unit 150. When the circuit is closed between the battery 155 and the first input 820 of the processing unit 150, the processing unit 150 interprets the input as a 'move up' instruction.

While the lift actuation sensor 310 is not activated, the wheels 182, 184 move downward unless the lower limit sensor 330 is activated (e.g., when the wheels 182, 184 are in a deployed position). When the lift actuation sensor 310 is not activated, a closed circuit is formed between the battery 150 and the upper limit sensor 330. The lower limit sensor 330 detects whether the wheels 182, 184 are in the deployed position closes or opens a connection between the lift actuation sensor 310 and the processing unit 150 based thereon. If the lower limit sensor 330 is activated, the lower limit sensor 330 forms a closed circuit between the lift actuation sensor 310 and ground. Alternatively, if the lower limit sensor 330 is not activated, the lower limit sensor 330 forms a closed circuit between the lift actuation sensor 310 and a second input 830 of the processing unit 150. When the circuit is closed between the battery 155 and the second input 830 of the processing unit 150, the processing unit 150 interprets the input as a 'move down' instruction.

In the illustrated example of FIG. 8, the lift actuation sensor 310, the upper limit sensor 320, the lower limit sensor 330 are shown in a state where the lift actuation sensor 310 is activated, the upper limit sensor 320 is activated, and the lower limit sensor 330 is not activated. In such a state, the wheels 182, 184 are fully deployed. Thus, the processing unit 150 sends an instruction to the actuator 160 to not move. Example states are discussed further in connection with FIG. 9.

FIG. 9 is a state diagram of the example high centering system 300 of FIGS. 3 and/or 8. In the illustrated example, four states are shown: a first state 950, a second state 960, a third state 970, and a fourth state 980. In the illustrated example, four states are shown because it is not likely for both the upper limit sensor 320 and the lower limit sensor 330 to be activated simultaneously.

In the first state 950, the lift activation switch 310 is not activated, the upper limit switch 320 is activated, and the lower limit switch 330 is not activated. As result 955 of these conditions, the high centering wheels 182, 184 are in a retracted position.

In the second state 960, the lift activation switch 310 is not activated, the upper limit switch 320 is not activated, and the lower limit switch 330 is not activated. As a result 965, the high centering wheels 182, 184 are moved towards the refracted position.

In the third state 970, the lift activation switch 310 is activated, the upper limit switch 320 is not activated, and the lower limit switch 330 is not activated. As a result 975 the high centering wheels 182, 184 are moved towards a deployed position.

In the fourth state 980, the lift activation switch 310 is activated, the upper limit switch 320 is not activated, and the lower limit switch 330 is activated. As a 985 the high centering wheels 182, 184 are in a deployed position.

While an example manner of implementing the high centering system 300 been illustrated in FIGS. 3 and/or 8, one or more of the elements, processes, and/or devices illustrated in FIGS. 3 and/or 8 may be combined, divided, re-arranged, omitted, eliminated, and/or implemented in any other way. Further, the example upper limit sensor 320, the example lower limit sensor 330, the example processing unit 150, the example battery 155, the example actuator 160 and/or, more generally, the example high centering system 300 of FIGS. 3 and/or 8 may be implemented by hardware, software, firmware and/or any combination of hardware, software and/or firmware. Thus, for example, any of the example upper limit sensor 320, the example lower limit sensor 330, the example processing unit 150, the example battery 155, the example actuator 160 and/or, more generally, the example high centering system 300 of FIGS. 3 and/or 8 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example upper limit sensor 320, the example lower limit sensor 330, the example processing unit 150, the example battery 155, and/or the example actuator 160 are hereby expressly defined to include a tangible computer-readable storage device or storage disk such as a memory, DVD, CD, Blu-ray, etc. storing the software and/or firmware. Further still, the example high centering system 300 of FIGS. 3 and/or 8 may include one or more elements, processes, and/or devices in addition to, or instead of, those illustrated in FIGS. 3 and/or 8, and/or may include more than one of any or all of the illustrated elements, processes, and devices.

Figure 10:
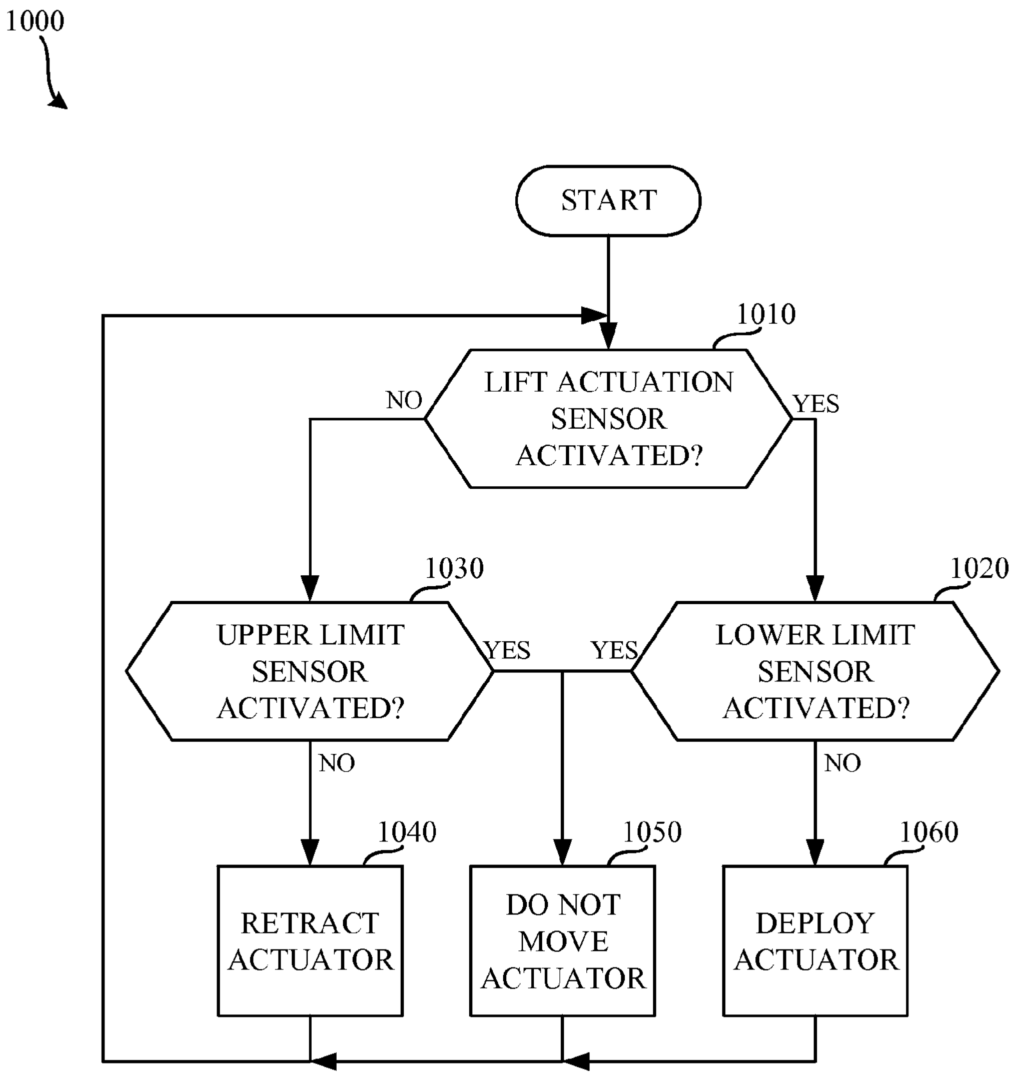
FIG. 10 is a flowchart representative of example machine-readable instructions which may be executed to implement the example high centering system of FIGS. 3 and/or 8.

A flowchart representative of example machine-readable instructions for implementing the high centering system 300 of FIGS. 3 and/or 8 is shown in FIG. 10. In this example, the machine-readable instructions comprise a program for execution by a processor such as the processor 1112 shown in the example computer 1100 discussed below in connection with FIG. 11. The program may be embodied in software stored on a computer-readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example high centering system 300 may alternatively be used. For example, the order of execution of the blocks may be changed, and/or some of the blocks described may be changed, eliminated, or combined.

As mentioned above, the example processes of FIG. 10 may be implemented using coded instructions (e.g., computer and/or machine readable instructions) stored on a tangible machine-readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible machine-readable storage medium is expressly defined to include any type of machine-readable storage device and/or storage disk and to exclude propagating signals. As used herein "tangible computer readable storage medium" and "tangible machine readable storage medium" are used interchangeable. Additionally or alternatively, the example process of FIG. 10 may be implemented using coded instructions (e.g., machine-readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of machine-readable medium and to exclude propagating signals. As used herein, when the phrase "at least" is used as the transition term in a preamble of a claim, it is open-ended in the same manner as the term "comprising" is open ended.

FIG. 10 is a flowchart representative of example machine-readable instructions 1000 which may be executed to implement the example high centering system 300 of FIGS. 3 and/or 8. The example process 1000 begins when the example high centering system 300 receives power via, for example, the battery 155.

The processing unit 150 determines if the lift actuation sensor 310 is activated (block 1010). If the lift actuation sensor 310 is activated, the high centering wheels 182, 184 should either presently be in or be moved towards a deployed position. If the lift actuation sensor 310 is activated, the processing unit determines whether the lower limit sensor 330 is activated (block 1020).

If the lift actuation sensor 310 is not activated, the high centering wheels 182, 184 should either presently be in or be moved to a retracted position. If the lift actuation sensor 310 is not activated, the processing unit 150 determines whether the upper limit sensor 320 is activated (block 1030). In some examples, rather than detecting a position of the lift actuation sensor 310, the processing unit 150 detects a position of the actuator 160. In some examples, the processing 150 stores a position value representing a position of the actuator 160 (e.g., a position value representing that the actuator 160 is retracted, a position value representing that the actuator 160 is extended, a position value representing that the actuator 160 is in an intermediate position). The stored and/or detected position value may be used to determine whether the lift actuator 160 is at an upper or lower limit. For example, the stored/detected position value may be compared to upper and/or lower limit values as a proxy for the inputs received from the upper limit sensor 320 and/or the lower limit sensor 330.

If the lift actuation sensor 310 is activated and the lower limit sensor 330 is activated, control proceeds to block 1050, where the processing unit 150 instructs the actuator 160 to take no action (e.g., do not move) (block 1050). If the lift actuation sensor 310 is activated and the lower limit sensor 330 is not activated, control proceeds to block 1060, where the processing unit 150 instructs the actuator 160 to move towards the deployed position (block 1060).

If the lift actuation sensor 310 is not activated and the lower limit sensor 330 is activated, control proceeds to block 1050, where the processing unit 150 instructs the actuator 160 to take no action (e.g., do not move) (block 1050). If the lift actuation sensor 310 is not activated and the lower limit sensor 330 is not activated, control proceeds to block 1040, where the processing unit 150 instructs the actuator 160 to move towards the retracted position (block 1040). In some examples, the processing unit 150 detects a position of the actuator 160 (e.g., completely retracted, completely extended/deployed, partially deployed/extended, etc.) If, for example, the processing unit 150 detects that the actuator 160 is in an intermediate position (e.g., partially deployed/extended) and that the lift actuation sensor 310 is not activated, the actuator 160 may be refracted (block 1040). Control then proceeds to block 1010, where the processing unit 150 determines whether the lift actuation sensor 310 is activated.

Figure 11:
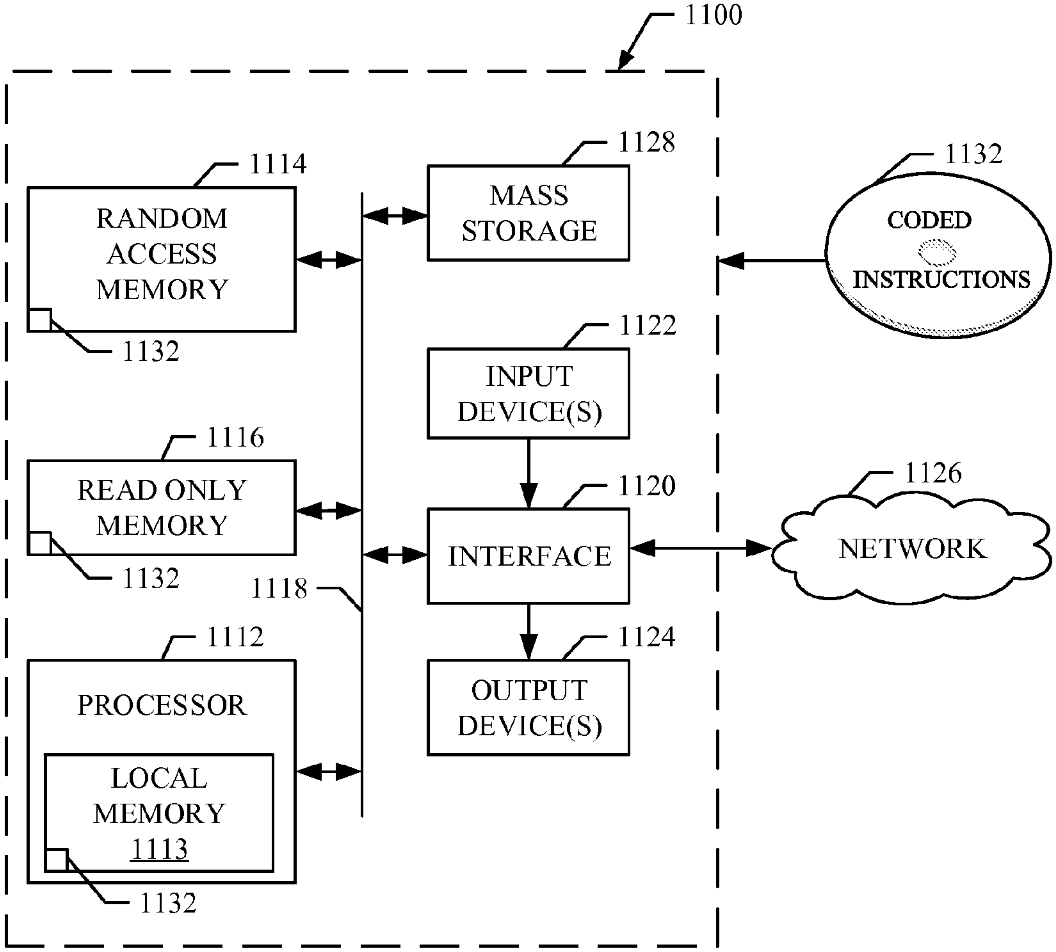
FIG. 11 is a block diagram of an example processor platform capable of executing the example machine-readable instructions of FIG. 9 to implement the example high centering system of FIGS. 3 and/or 8.

FIG. 11 is a block diagram of an example processor platform 1100 capable of executing the instructions of FIG. 10 to implement the example high centering system 300 of FIG. 3. The processor platform 1100 can be, for example, a server, a personal computer, a mobile device, or any other type of computing device.

The processor platform 1100 of the instant example includes a processor 1112. For example, the processor 1112 can be implemented by one or more integrated circuits, logic circuits, microprocessors or controllers from any desired family or manufacturer.

The processor 1112 includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 also includes an interface circuit 1120. The interface circuit 1120 may be implemented by any type of interface standard, such as an Ethernet interface, a universal serial bus (USB), and/or a PCI express interface.

One or more input devices 1122 are connected to the interface circuit 1120. The input device(s) 1122 permit a user to enter data and commands into the processor 1112. The input device(s) can be implemented by, for example, a keyboard, a keypad, a mouse, a touchscreen, a track-pad, a trackball, and/or a voice recognition system.

One or more output devices 1124 are also connected to the interface circuit 1120. The output devices 1124 can be implemented, for example, by actuators (e.g., the actuator 160, the height adjustment actuators 170 and/or 175, etc.), display devices (e.g., a liquid crystal display, a Light Emitting Diode (LED), a printer, a buzzer, and/or speakers), etc.

The interface circuit 1120 also includes a communication device such as a transmitter, a receiver, a transceiver, a modem, and/or a network interface card to facilitate exchange of data with external machines (e.g., computing devices of any kind) via a network 1026 (e.g., an Ethernet connection, a digital subscriber line (DSL), a telephone line, a coaxial cable, a cellular telephone system, etc.). However, the communication device may be implemented by, for example, a universal serial bus (USB) port, a serial port, a parallel port, Bluetooth, etc.

The processor platform 1100 also includes one or more mass storage devices 1128 for storing software and data. Examples of such mass storage devices 1128 include floppy disk drives, hard drive disks, compact disk drives, Blu-ray drives, RAID systems, and digital versatile disk (DVD) drives.

The coded instructions 1132 of FIG. 10 may be stored in the mass storage device 1128, in the volatile memory 1014, in the non-volatile memory 1116, and/or on a removable storage medium such as a CD or DVD.

Methods, apparatus, and articles of manufacture which deploy enable a high centering wheel based on a position of a pedal associated with a brake of a hospital gurney have been disclosed. Additionally, a braking system has been disclosed which is under constant tension, thereby reducing the likelihood that a brake of a hospital gurney may be partially engaged.

Although certain example methods, apparatus, and articles of manufacture have been described herein, the scope of coverage of this patent is not limited thereto. On the contrary, this patent covers all methods, apparatus, and articles of manufacture fairly falling within the scope of the claims of this patent.

We claim:

1. A hospital gurney comprising:

a sensor to detect a position of a foot pedal of the hospital gurney, the sensor to detect the position of the foot pedal by detecting a position of a lateral rod, the lateral rod mechanically coupled to the foot pedal by a cross rod and a cam;

a processor responsive to the sensor to create a movement instruction based on the position of the foot pedal; and an actuator to move a first wheel based on the movement instruction, the first wheel located between a first end of the hospital gurney and a second end of the hospital gurney.

2. The hospital gurney as described in claim 1, wherein the actuator is to deploy the first wheel when the foot pedal is in a first position.

3. The hospital gurney as described in claim 2, wherein the actuator is to retract the first wheel when the foot pedal is in a second position different from the first position.

4. The hospital gurney as described in claim 2, wherein the foot pedal is a brake pedal, and when in a second position the foot pedal causes a second wheel of the hospital gurney to lock, the second wheel located at the first end of the hospital gurney.

5. The hospital gurney as described in claim 2, wherein the actuator is a linear actuator.

6. A hospital gurney comprising:

a sensor to detect a position of a foot pedal of the hospital gurney, the sensor to detect the position of the foot pedal by detecting a lateral position of a lateral rod, the lateral rod mechanically coupled to the foot pedal by a cross rod and a cam;

a processor responsive to the sensor to create a movement instruction based on the position of the foot pedal; and an actuator to move a first wheel based on the movement instruction, the first wheel located between a first end of the hospital gurney and a second end of the hospital gurney, the actuator to deploy the first wheel when the foot pedal is in a first position.

7. The hospital gurney as described in claim 1, further comprising:

a second wheel located at the first end of the hospital gurney, the first wheel having a first size and the second wheel having a second size, the first size being greater than the second size.

8. The hospital gurney as described in claim 1, wherein the first wheel is located closer to the first end of the hospital gurney than the second end of the hospital gurney.

9. The hospital gurney of claim 1, further comprising:

a first set of wheels at a first end of the gurney; and a second set of wheels at the second end of the gurney, the center first wheel being located intermediate the first set of wheels and the second set of wheels.

10. A method of deploying a center wheel of a hospital gurney, the method comprising:

detecting a position of a lateral rod, the lateral rod mechanically coupled to a foot pedal of the hospital gurney to move in response to movement of the foot pedal;

generating, with a processor, a movement instruction based on the position of the lateral rod, the movement instruction to instruct an actuator to deploy a center wheel when the lateral rod is in a first position, the movement instruction to instruct the actuator to retract the center wheel when the lateral rod is in a second position; and transmitting the movement instruction signal from the processor to the actuator to control the position of the center wheel.

11. The method as described in claim 10, wherein the foot pedal is a brake pedal, and when in the second position, the brake pedal causes a second wheel of the hospital gurney to lock.

12. The method as described in claim 10, wherein the movement instruction is to instruct the actuator to retract the center wheel when the foot pedal is in a third position, the third position intermediate the first position and the second position.

13. A hospital gurney comprising:

a first cross rod extending from a first caster to a second caster;

a first cam to couple a first lateral rod to the first cross rod, the first cam disposed above the first cross rod;

a second cam to couple a second lateral rod to the first cross rod, the second cam disposed below the first cross rod;

a second cross rod extending from a third caster to a fourth caster;

a third cam to couple the first lateral rod to the second cross rod, the third cam disposed above the second cross rod; and a fourth cam to couple the second lateral rod to the second cross rod, the fourth cam disposed below the second cross rod.

14. The hospital gurney as described in claim 13, further comprising:

a first wheel lock connected to the first caster; and a second wheel lock connected to the second caster, wherein the first cross rod, when rotated in a first rotational direction, engages the first wheel lock and the second wheel lock.

15. The hospital gurney as described in claim 14, further comprising:

a first wheel coupled to the first caster; and a second wheel coupled to the second caster, the first and second casters located at adjacent corners of a frame of the hospital gurney, wherein the first wheel lock, when engaged, prevents movement of the first wheel.

16. The hospital gurney as described in claim 14, further comprising:

a third wheel central to a frame of the hospital gurney, wherein the wheel is lowered when the first cross rod is rotated in a second rotational direction, the second rotational direction opposite the first rotational direction.

17. The hospital gurney as described in claim 14, wherein when the first cross rod is rotated in the first rotational direction:

the first lateral rod moves in a first lateral direction; and the second lateral rod moves in a second lateral direction.

18. The hospital gurney as described in claim 17, wherein the first lateral direction is opposite the second lateral direction.

19. The hospital gurney as described in claim 17, wherein the second cross rod is rotated in the first rotational direction when the first lateral rod moves in the first lateral direction.

20. The hospital gurney as described in claim 13, further comprising a foot pedal attached to the first cross rod.

21. The hospital gurney as described in claim 13, wherein the first cross rod and the second cross rod comprise hexagonal tubing.

22. The hospital gurney as described in claim 13, wherein the first lateral rod and the second lateral rod comprise square tubing.

* * * * *

UNITED STATES PATENT AND TRADEMARK OFFICE

CERTIFICATE OF CORRECTION

PATENT NO. : 8,781,677 B2
APPLICATION NO. : 13/832935
DATED : July 15, 2014
INVENTOR(S) : Roberts It is certified that error appears in the above-identified patent and that said Letters Patent is hereby corrected as shown below:

In the Claims

Column 18, line 58 claim 9, delete “center”.

Column 19, line 4 claim 10, delete “signal”.

Signed and Sealed this
Seventh Day of October, 2014

Michelle K. Lee

Michelle K. Lee
*Deputy Director of the United States Patent and Trademark Office*